US011357213B2

United States Patent
Saukko

(10) Patent No.: US 11,357,213 B2
(45) Date of Patent: Jun. 14, 2022

(54) LEASH ASSEMBLY

(71) Applicant: POLAR METALLI OY, Keminmaa (FI)

(72) Inventor: Matti Saukko, Keminmaa (FI)

(73) Assignee: GENTLEASH OY, Maula (FI)

( * ) Notice: Subject to any disclaimer, the term of this patent is extended or adjusted under 35 U.S.C. 154(b) by 0 days.

(21) Appl. No.: 17/422,457

(22) PCT Filed: Jan. 14, 2020

(86) PCT No.: PCT/EP2020/050780
§ 371 (c)(1),
(2) Date: Jul. 13, 2021

(87) PCT Pub. No.: WO2020/148262
PCT Pub. Date: Jul. 23, 2020

(65) Prior Publication Data
US 2022/0079119 A1 Mar. 17, 2022

(30) Foreign Application Priority Data
Jan. 14, 2019 (FI) ...................................... 20195021

(51) Int. Cl.
*A01K 27/00* (2006.01)
*B65H 75/44* (2006.01)

(52) U.S. Cl.
CPC ....... *A01K 27/004* (2013.01); *B65H 75/4431* (2013.01); *B65H 75/4442* (2013.01);
(Continued)

(58) Field of Classification Search
CPC .... A01K 27/004; A01K 27/003; A01K 27/00; B65H 75/4431; B65H 75/4434; B65H 75/4442
See application file for complete search history.

(56) References Cited

U.S. PATENT DOCUMENTS 4,269,150 A    5/1981 McCarthy
4,501,230 A *  2/1985 Talo .................... A01K 27/004
                                            119/796
(Continued)

FOREIGN PATENT DOCUMENTS

EP      2 621 265       2/2018
WO      2014/118758     8/2014

OTHER PUBLICATIONS

International Search Report for PCT/EP2020/050780 dated Apr. 22, 2020, 3 pages.
(Continued)

*Primary Examiner* — Kristen C Hayes
(74) *Attorney, Agent, or Firm* — Nixon & Vanderhye

(57) ABSTRACT

A retractable leash assembly for a pet animal, such as a dog, is provided. The leash assembly includes a casing body with a handle attached to the body by an at least one hinge joint, a braking device, and a spool arrangement with an extendable lead line wound thereabout and configured attachable to the pet animals' collar or harness, wherein in the leash assembly the handle is configured to articulate about the joint with regard to the casing body, the articulation movement of the handle being triggered by the pulling force exerted on the lead line by the animal kept on the leash, and wherein, by virtue of the articulation movement the braking device actuates a braking action causing the lead line to reduce unwinding speed proportionally with an increase in the pulling force.

20 Claims, 4 Drawing Sheets

(52) U.S. Cl.
CPC .. *B65H 2403/422* (2013.01); *B65H 2403/725* (2013.01); *B65H 2557/20* (2013.01)

(56) References Cited

U.S. PATENT DOCUMENTS

| | | | |
|---|---|---|---|
| 9,339,014 | B1 | 5/2016 | Wettermann et al. |
| 2003/0145804 | A1 | 8/2003 | Vaccari |
| 2006/0201449 | A1 | 9/2006 | DiDonato |
| 2012/0079994 | A1 | 4/2012 | Chefetz |
| 2012/0234959 | A1* | 9/2012 | Christianson ........ A01K 27/004 242/396.1 |
| 2015/0128879 | A1* | 5/2015 | Anderson ............ A01K 27/004 119/796 |
| 2017/0079245 | A1* | 3/2017 | Omelchenko ........ A01K 27/004 |
| 2019/0082658 | A1* | 3/2019 | Catena ................. A01K 27/004 |
| 2020/0267937 | A1* | 8/2020 | Pagan ................ B65H 75/4431 |

OTHER PUBLICATIONS

Written Opinion of the ISA for PCT/EP2020/050780 dated Apr. 22, 2020, 6 pages.

* cited by examiner

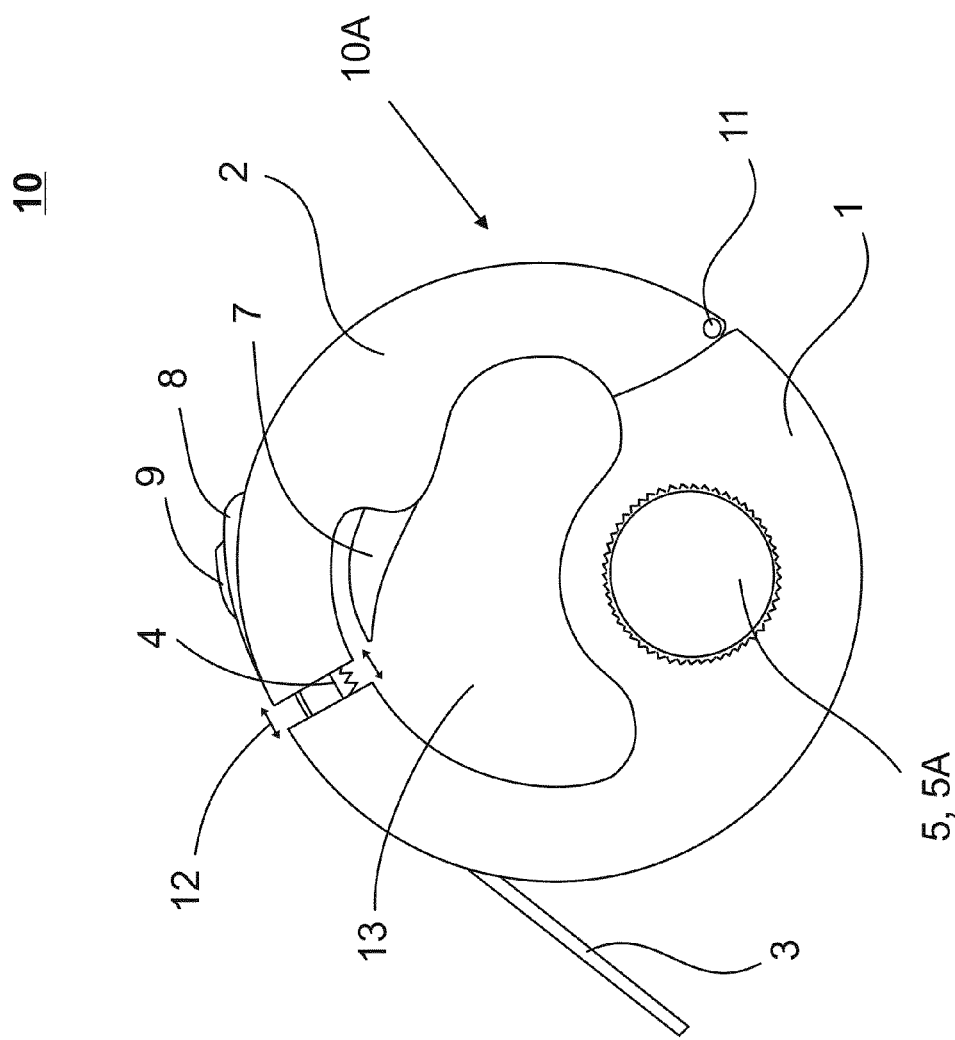
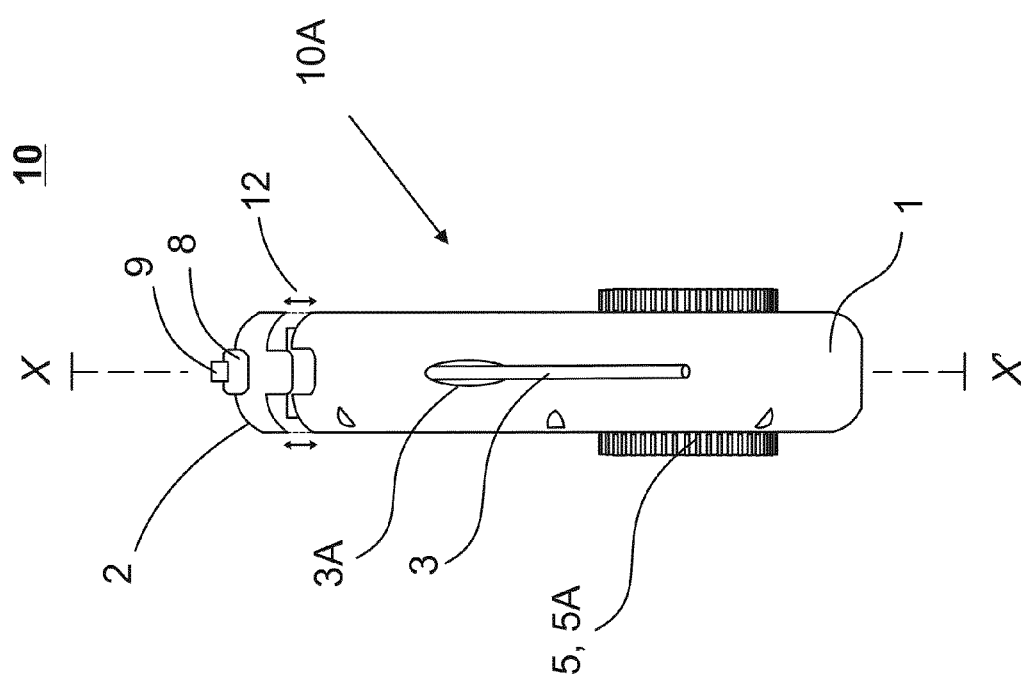
Figure 1B
Figure 1A

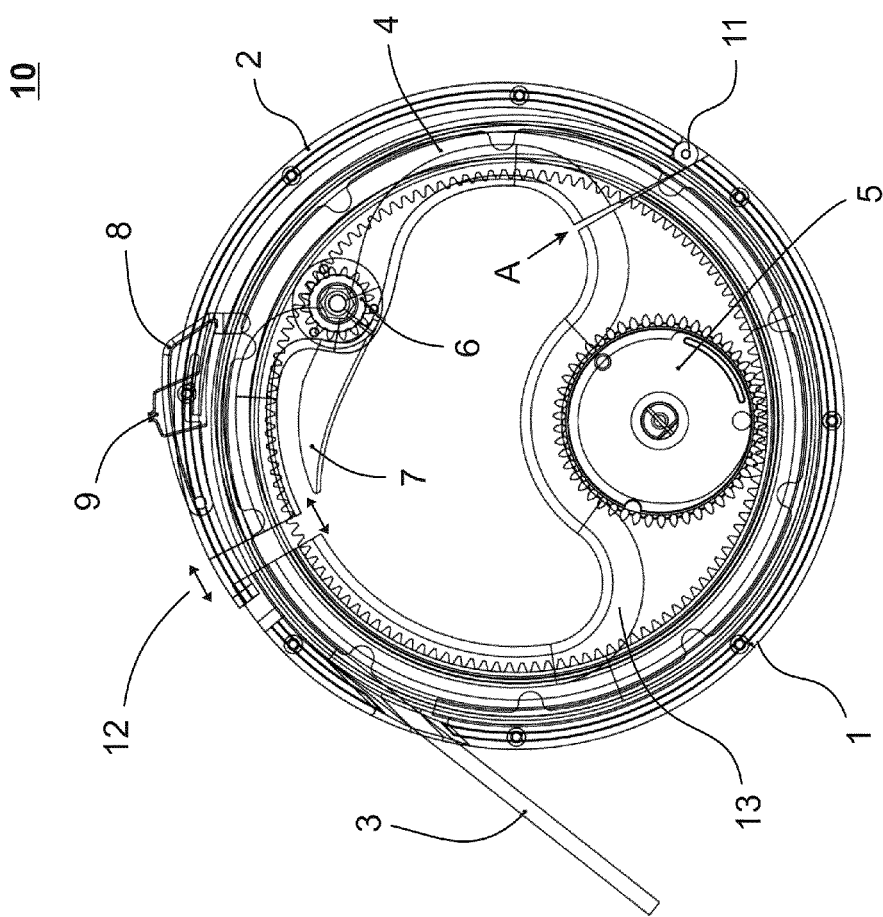
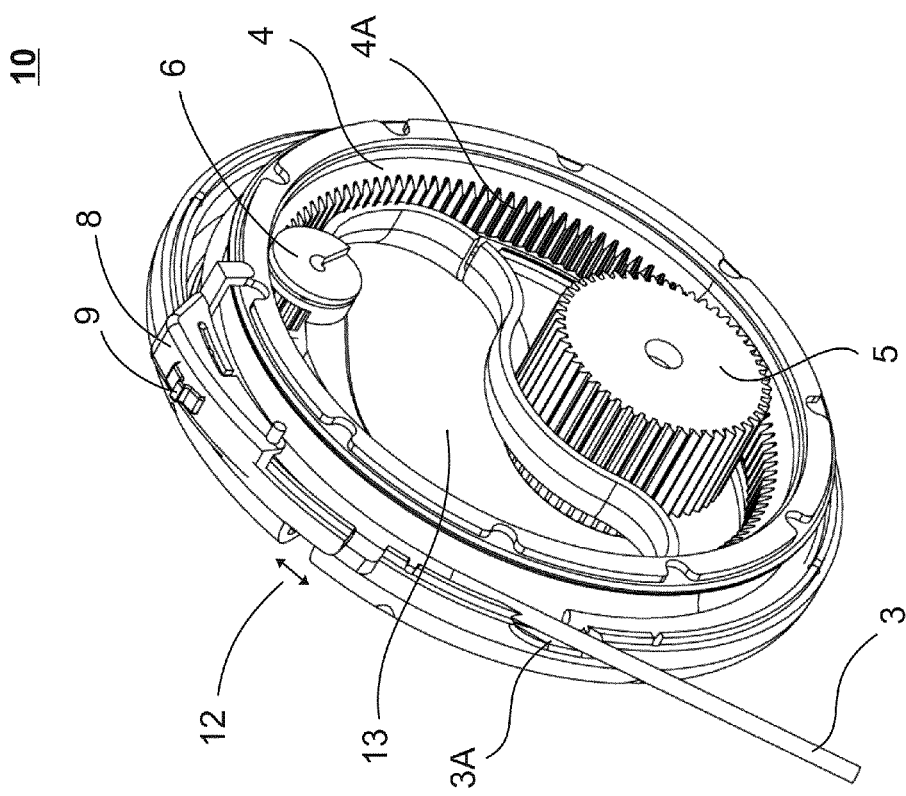
Figure 2A
Figure 2B

LEASH ASSEMBLY

CROSS-REFERENCE TO RELATED APPLICATIONS

This application is the U.S. national phase of International Application No. PCT/EP2020/050780 filed Jan. 14, 2020 which designated the U.S. and claims priority to FI 20195021 filed Jan. 14, 2019, the entire contents of each of which are hereby incorporated by reference.

BACKGROUND OF THE INVENTION

Field of the Invention

Generally the present invention relates to retractable leashes for pets and companion animals, such as dogs. In particular, the invention concerns a retractable leash assembly configured to generate and develop a braking action proportionally to an amount of traction force exerted on a leash mechanism by a pulling animal.

Description of the Related Art

Retractable leashes or leads for pets and companion animals, especially for dogs, are well known in the art. Conventional retractable leash is provided as a handle formed by a plastic casing and comprising a spring-loaded spool with a cord or a flat band wound around the spool and having an external end equipped with attaching means for a collar or a harness.

As dog pulls on, the cord unwinds and extends outside the casing typically to a predetermined length. In an absence of traction force the cord self-rewinds around the spool via the spring-loading action, while being retracted back into the casing. Typically, a retractable dog leash has user-controlled means, such as a lever, a button, and the like, to control cord extension and/or a brake appliance.

One of the most common drawbacks associated with utilization of conventional leash devices is that the above-mentioned brake appliances are mostly configured for a sudden brake, thereupon the spool is locked at once. As a result, the dog, often running full pace, is suddenly forced to stop. This is painful for the dog and may cause injuries to the dog's neck and spine. As a result of significant stopping force, also the dog's owner may tear his hands, receive a twisting injury to arms or shoulders or even fall down. Moreover, sudden impact may cause the cord to break, in which event the unleashed animal may get severely injured, or scare or even hurt others.

A number of solutions are known to develop gradual braking. For example, in U.S. Pat. No. 9,339,014 (Wettermann et al) a retractable pet leash system is disclosed. In the system a friction-based braking action is initiated by a user by pressing a push button. Braking efficiency is thus proportional to the force exerted (by the user) on the push button. Similar devices are disclosed in US 2012/079994 (Chefetz) and in WO 2014/118758 (Vaccari). All these devices are based on manual triggering of the braking action, by shifting an appropriate switch or pressing a button.

EP 2 621 265 B1 (Ek) discloses a retractable leash provided as a solid handle with an automatic braking mechanism configured to prevent extraction of cord out of the casing if it is extracted at a speed exceeding a predetermined threshold. Automatic braking action is mediated by a number of internal appliances forced against one another upon increase of centrifugal force. Due to significant number of internal interconnected parts, the mechanism may be easily susceptible to damages upon mechanical impacts.

In this regard, it is still desirable to provide a retractable leash device configured for gradual braking, whereby forcing a pet to perform harsh stops can be avoided. It is further desirable that the braking mechanism is reliable and durable.

SUMMARY OF THE INVENTION

An objective of the present invention is to remove or at least to alleviate the drawbacks of the related art. The objective is achieved by various embodiments of a retractable leash assembly.

In preferred embodiment, a retractable leash assembly for a pet animal is provided comprising a casing body with a handle attached to the body by an at least one hinge joint, a braking device, and a spool arrangement with an extendable lead line wound thereabout and configured attachable to the pet animals' collar or harness, wherein in said leash assembly the handle is configured to articulate about the joint with regard to the casing body, said articulation movement of the handle being triggered by the pulling force exerted on the lead line by the animal kept on the leash, and wherein, by virtue of said articulation movement the braking device actuates a braking action causing the lead line to reduce unwinding speed proportionally with an increase in the pulling force.

In an embodiment, in said retractable leash assembly, upon articulation movement of the handle about the joint, the braking device is brought into contact with the spool arrangement and/or the lead line.

In an embodiment, in the retractable leash assembly, the braking device is configured to preserve its' contact with the spool arrangement and/or the lead line as long as the pulling force is exerted on the lead line.

In an embodiment, in the retractable leash assembly, upon articulation movement of the handle about the joint, the braking device is configured to interconnect with the spool arrangement.

In an embodiment, in the retractable leash assembly, upon articulation movement of the handle about the joint, the braking device and the spool arrangement establish a spur gear system, wherein an external spur gear is established by the braking device and an internal spur gear is established by the spool arrangement.

In another embodiment, in the retractable leash assembly, the braking device is configured as a friction brake device.

In an embodiment, in the retractable leash assembly, the contact area and/or frictional force between the braking device and any one or both of the spool arrangement and the lead line increase proportionally with an increase in the pulling force.

In an embodiment, in the retractable leash assembly, the braking device is disposed inside the handle.

In an embodiment, the retractable leash assembly further comprises a winding mechanism, preferably configured as a spring-loaded winding mechanism. In an embodiment, the winding mechanism is disposed inside the casing body.

In an embodiment, the retractable leash assembly further comprises a braking power control device configured to adjust the rate, at which the lead line unwinds from the spool arrangement.

In an embodiment, the retractable leash assembly further comprises an instant-stop brake device, preferably equipped with a position lock arrangement.

In an embodiment, in the retractable leash assembly, the lead line is configured as a cord or a flat strap.

In another aspect, use of the retractable leash assembly according to the previous aspect for walking and training a pet animal is provided. In an embodiment, use is provided for walking and training a dog.

The utility of the present invention arises from a variety of reasons depending on each particular embodiment thereof. On the whole, the invention allows the user to prevent the pet animal from pulling on in a gentle manner. In the leash assembly provided herewith, the braking action is developed and maintained by the pulling force exerted on a lead line by a pet animal kept on the leash; therefore, in most instances the pet is allowed to "control" its' pulling force by itself. By such an arrangement a pet animal, especially, a dog, can be trained for appropriate leash walking (without pulling on) in an efficient manner and/or in shorter timeframe.

Additionally, the leash assembly disclosed hereby encourages the user to avoid instant braking, during what the pet is forced to stop all of a sudden. Inconveniences and injuries for both pet and the user can thus be effectively avoided.

Moreover, the leash assembly provided herewith is straightforward and cost-effective to manufacture.

In the context of the present disclosure, the term "articulate" is utilized interchangeably with the term "rotate".

The expression "a number of" is used in hereby to indicate any positive integer starting from one (1).

Different embodiments of the present invention will become apparent by consideration of the detailed description and accompanying drawings.

BRIEF DESCRIPTION OF THE DRAWINGS

FIGS. 1A and 1B show a front view and a side view, accordingly, of a retractable leash assembly 10, according to an embodiment.

FIGS. 2A and 2B show a prospective view and a side view of the leash assembly 10 with one half of the casing removed.

DETAILED DESCRIPTION OF THE EMBODIMENTS

Figure 3A:
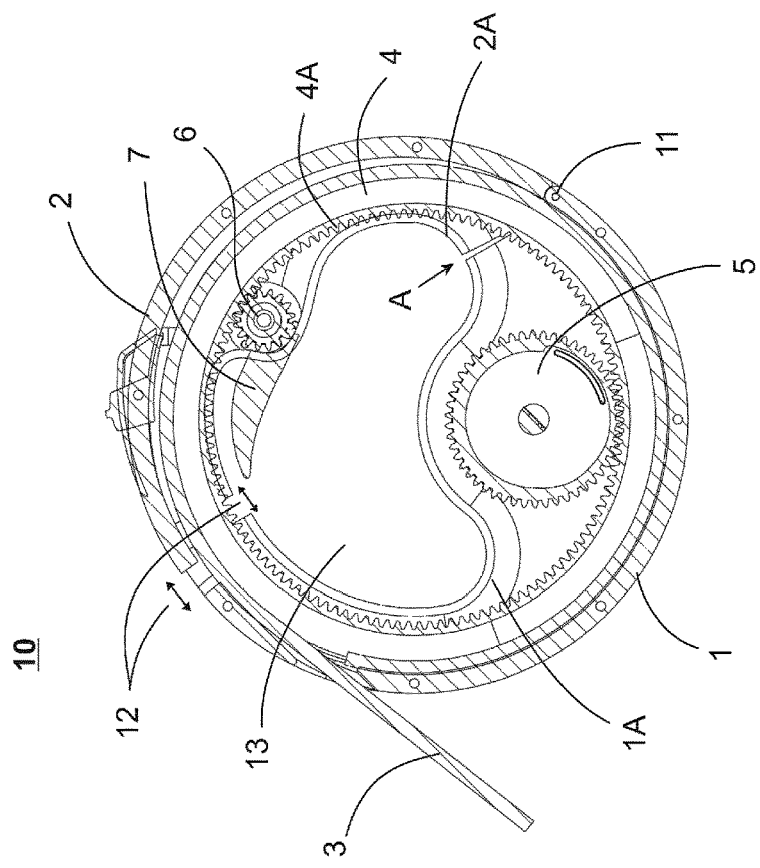
FIGS. 3A and 3B are side views of the leash assembly 10 in "brake-off" and "brake-on" positions, accordingly.

Detailed embodiments of the present invention are disclosed herein with the reference to accompanying drawings. The same reference numerals are used throughout the drawings to refer to same members as follows:
10—a leash assembly;
10A—a casing;
1—a casing body;
2—a handle;
1A, 2A—internal (moulded) scaffold structures within the casing;
3, 3A—a lead line and a related aperture in the casing, accordingly;
4, 4A—a spool arrangement and an annular internal gear, accordingly;
5, 5A—parts of a winding mechanism;
6—a braking device (pulling force-actuated);
7—a braking power control device;
8—an instant-stop brake device;
9—a position lock arrangement;
11—a hinge joint;
12—a gap formed between the casing body and the handle;
13—a hand opening.

FIGS. 1A and 1B illustrate at 10 a concept underlying various embodiments of a retractable leash assembly for a pet animal, hereafter, the "leash assembly", in accordance with the present invention. The leash assembly 10 comprises a casing 10A, having a body 1 with a handle 2 attached to the body 1 by an at least one mechanical bearing 11 allowing the connecting parts (hereby, 1 and 2) to rotate relative to one another about a predetermined axis of rotation. The bearing 11 is preferably configured as a turning joint 11, such as a hinge joint, for example. The body 1 and the handle 2 form an opening 13 preferably designed such, as provide a comfortable hand grip for a user (FIG. 1B).

A lead line 3 wound about a spool arrangement (not shown) is configured to extends out of the casing 10A via an aperture 3A disposed, in an embodiment, on the casing body 1. The leash assembly 10 can be further configured such, as to comprise the aperture 3A on the handle 2 (not shown). The lead line 3 is preferably configured as a cord/a string or as a flat strap. The lead line 3 is preferably provided in a predetermined length, which may vary: e.g. 5 m, 10 m or 25 m, depending on size, weight, type and/or breed of the pet animal.

The lead line 3, at its' end extendable through the aperture 3A, comprises means for attaching the lead line and the leash assembly, accordingly, to a pet animal's collar or a body harness. Said attachment means is preferably a snap hook or a so called carabiner clip attachment, well known in the art. It is clear to the one skilled in the art that the definition of said attachment means can further include a coupler, for example, enabling walking several pets at once with a single leash assembly.

Figure 4:
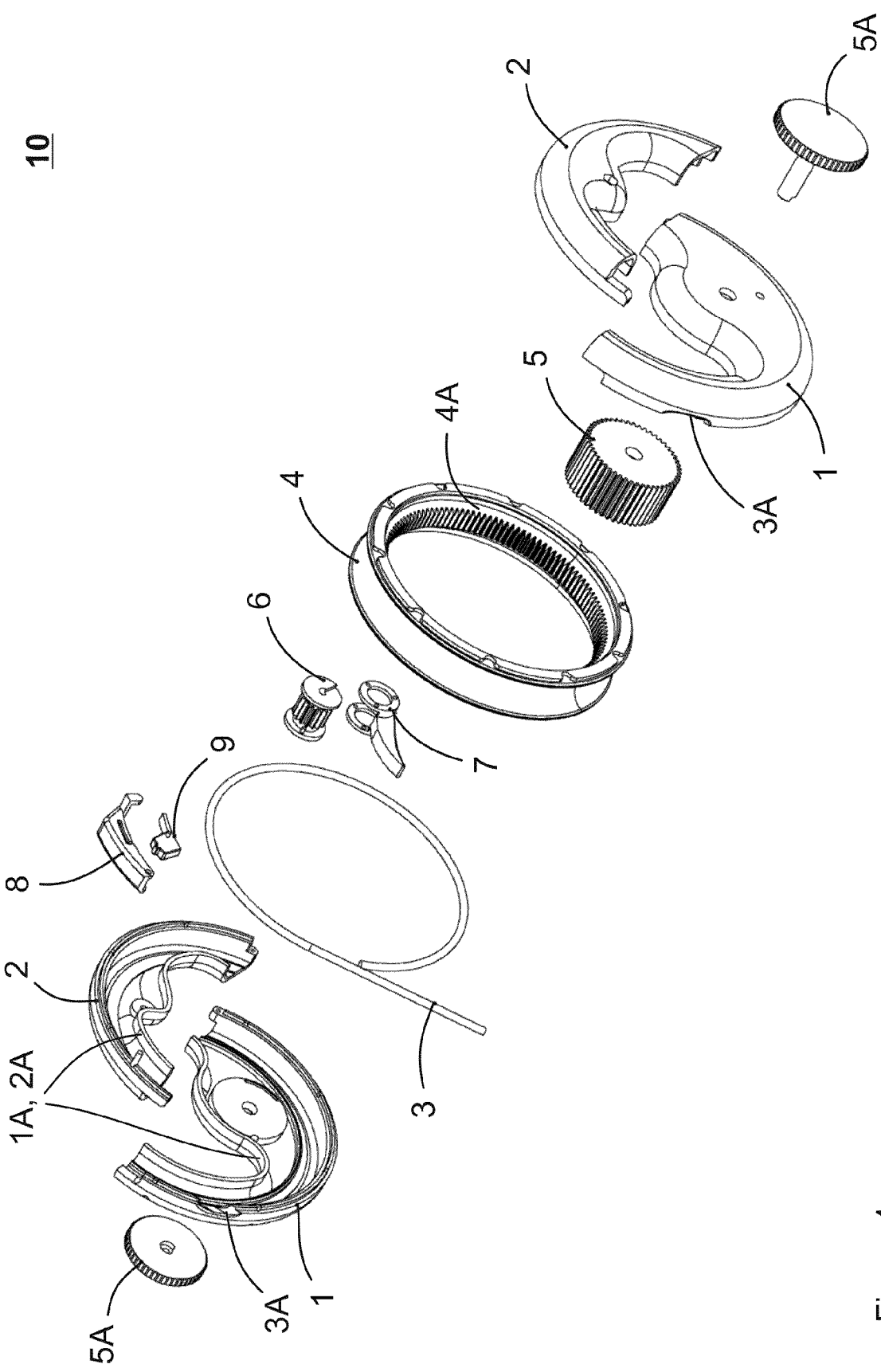
FIG. 4 is an exploded view of the leash assembly 10.

In an embodiment, each part of the casing 10A, namely, the body 1 and the handle 2, is composed of two halves, right and left (FIG. 4) joined together along a line X-X' (FIG. 1A). The halves are preferably made of durable plastics by moulding or any other appropriate method.

FIGS. 2A and 2B show the leash assembly 10 with a sidewall (represented by one of the moulded halves) removed. Inside the casing 10A a spool arrangement 4 is disposed having the lead line 3 wound thereabout. In the leash assembly shown on FIGS. 1A, 2B, the spool arrangement 4 is configured as a rim comprising or consisting of an annular gear device 4A having teeth cut on an inside surface thereof. In some embodiments, the invention largely exploits principles of spur gearing established by a gear arrangement, in which a so called internal spur gear (a rim or a cylinder having teeth cut on its' internal surface) is matched with an external gear (having teeth cut on its' external surface).

The leash assembly further comprises a winding mechanism 5, 5A. The winding mechanism is preferably disposed inside the casing body 1. It is preferred, that the winding mechanism is a spring-loaded winding mechanism comprising an at least one spring or a coil, such as a spiral spring, for example. Tension generated by the spring causes the lead line 3 to extend and to retract, as the pet animal is allowed to wander around, and prevents the lead line from getting loose and dropping on the ground.

In the leash assembly shown on FIGS. 2A, 2B, the spiral spring (not shown) may be located in a housing embodied as an external gear 5 on a stub shaft bearing 5A (shown on FIG. 4), wherein the gear 5 meshes with the annular gear 4A of the spool arrangement 4. The spring can be connected by its' one end to the stub shaft 5A and by its' another end to an interior of the gear 5. The stub shaft bearings 5A form static portions of the winding mechanism 5.

In the embodiment described (FIGS. 1A, 1B, 4), when the leash assembly 10 is fully assembled the gear 5 remains inside the casing 10A, whereas the bearing elements 5A establish lateral panels on both side faces of the casing 10A. The elements 5, 5A and the at least one spring thus establish the winding mechanism.

In some configurations, the spring can be arranged outside the gear 5, in which case the bearing 5A can be configured to translate rotation movement of the spring (not shown).

Figure 3B:
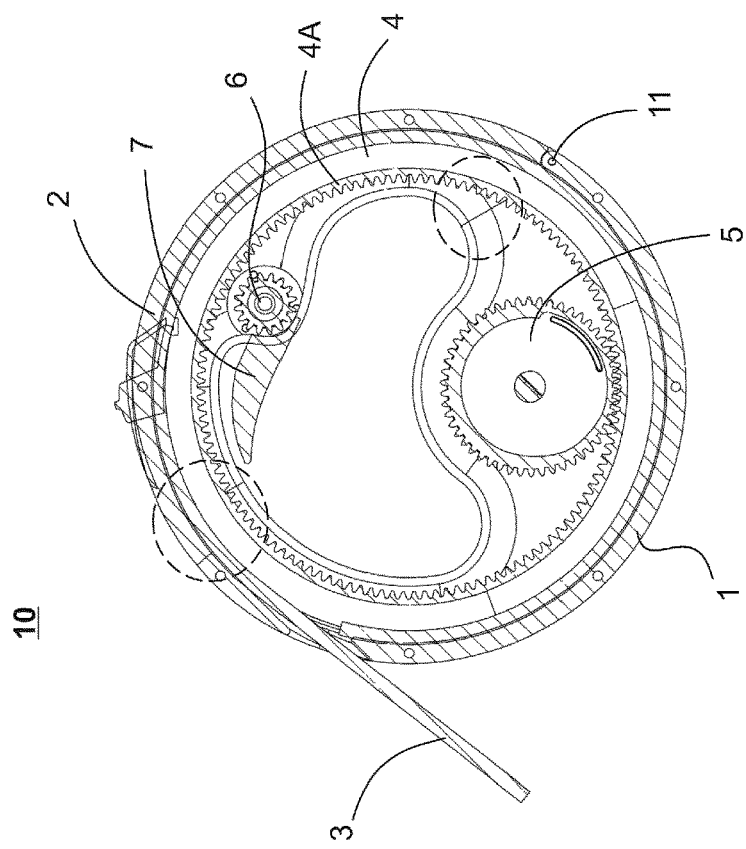

The leash assembly 10 further comprises a braking device 6. The braking device is preferably disposed inside the handle 2. Reference is made to FIGS. 3A and 3B that illustrate the mechanism underlying gradual development of a braking action proportionally to an increase in the pulling force exerted by an animal pulling on the leash, according to the inventive concept. FIG. 3A shows the leash assembly with no pulling force exerted onto the lead line 3 (no braking action; "brake off" position); whereas FIG. 3B shows the leash assembly with the lead line attached to a pulling animal (braking action initiated; "brake on" position).

For clarity purposes, it should be noted that detachable elements provided inside the casing 10A and the leash assembly 10 are supported by in internal scaffold structures 1A, 2A (see FIG. 3B, 4) provided, by moulding, for example, on inner sides of the casing (left and right halves, accordingly).

It is preferred that in the leash assembly 10, the handle 2 is configured to articulate about the joint 11 with regard to the casing body 1. Said articulation (or rotation) movement is generated by the pulling force exerted on the lead line 3 by the animal kept on the leash. Moreover, by virtue of the articulation movement, triggered by an animal pulling on the lead line 3, the braking device 6 actuates a braking action causing the lead line 3 to reduce its' unwinding speed proportionally with an increase in the pulling force.

In the leash assembly 10 shown on FIGS. 3A and 3B the braking action is developed as follows. When the leash assembly is not in use or it is used to walk a pet animal that does not pull on, the handle 2 is tightly engaged with the casing body 1. Connection points between the casing body 1 and the handle 2 are depicted on FIG. 3A by dashed circles. The lead line 3 is fully wound about the spool arrangement 4 except the (pet collar or harness) attachment means (not shown) remaining outside the casing 10A. The winding mechanism 5 is relieved of tension.

Once the pet animal gains speed, the lead line 3 starts unwinding from the spool arrangement 4. The animal imparts tractive (pulling) force to the lead line 3, whereby torque, arising from the pulling force, is exerted at the handle 2, which is caused to rotate about the joint 11 with regard to the casing body 1. The handle rotates about the joint axis to a predetermined angle, whereupon the braking device 6 is brought into contact with the spool arrangement 4 and/or the lead line 3. Increase in torque is proportional to an increase in the pulling force.

As the braking device 6 contacts the spool arrangement 4 and/or the lead line 3, the spool arrangement is caused to reduce its' rotation speed. At the same time, the lead line 3 is caused to reduce its unwinding speed, accordingly. Rotation speed of the spool and unwinding speed of the lead line are reduced proportionally with an increase in the pulling force exerted on the lead line and the leash assembly. At the same time, the contact area and/or frictional force between the braking device 6 and any one or both of the spool arrangement 4 and the lead line 3 increase proportionally with an increase in the pulling force. In other words, the more pet animal pulls on the leash, the greater is the magnitude of the braking action.

It is preferred that the braking device 6 preserves its' contact with the spool arrangement 4 and/or the lead line 3 as long as the pulling force is exerted on the lead line 3.

In some configurations, articulation/rotation of the handle 2 about the joint 11 with regard to the casing body 1 in the above described manner causes the braking device 6 to interconnect or interlock with the spool arrangement 4. Thus, in the embodiment shown on FIGS. 3A and 3B the braking device 6 is configured as a gear element, optionally provided on a stub shaft bearing, a spool or a barrel, whereby said braking device 6 and the spool arrangement 4 (via its' internal gear 4A) together establish a spur gear system, in accordance to the above disclosed.

When comparing FIGS. 3A and 3B one may notice that, upon a braking action (that causes rotation of the handle 2 about the joint 11), partial disengagement of the handle 2 from the body 1 occurs, whereby a cleft indicated by an arrow A on FIG. 3B is formed. The handle 2 remains attached to the body 1 by the joint 11. Formation of said cleft in the casing 10A causes the internal scaffold structure 2A within the casing (namely, in the handle 2) to perform a shift in a direction essentially opposite to that of the pulling force, wherein direction of the pulling force (acting on the lead line 3 and the leash assembly 10) essentially corresponds to the direction of movement of the pet animal.

Upon the above mentioned shift in the internal scaffold structure 2A, the braking device 6 is "pushed" into contact with the spool arrangement 4, with "pushing" occurring in the direction essentially opposite to the direction of the pulling force.

The braking device 6 configured as an external gear thus interconnects or meshes with the internal gear 4A of the spool arrangement 4. Spatial movement of the "pinion" gear 6 on the annular gear 4A is limited due to provision of the internal scaffold structure 2A (see FIG. 3B). As a consequence, rotation of the spool 4 is caused to slow down and unwinding speed of the lead line 3 wound about said spool is caused to reduce accordingly. Rotation speed of the spool arrangement 4 and unwinding speed of the lead line 3 are reduced proportionally with an increase in the pulling force exerted on the lead line 3 by an animal kept on the leash.

The above described arrangement allows for establishing a gradual braking action exerted on the pet animal.

As mentioned hereinabove, formation of the cleft A (FIG. 3B) and shifting of the internal scaffold structure 2A in the direction essentially opposite to that of the pulling force (events triggered upon articulation of the handle 2 about the joint 11 with regard to the casing body 1) are accompanied by formation of a gap 12 (FIGS. 1, 2 and 3B) in the casing structure 10A, whereupon the casing body 1 partially disengages from the handle 2. In the embodiment, the casing body 1 and/or the handle 2 are configured to slide along the essentially annular spool arrangement 4 such, that the gap 12 is formed. In an absence of pulling force, the handle 2 and/or the casing body 1 slide back to an initial position (as shown of FIG. 3A).

In some alternative configurations (not shown) the braking device 6 can be configured as a friction brake device. In such a case, the braking device can be brought into contact directly with the lead line wound about the spool arrangement. For mentioned configuration it is advantageous that the braking device is disposed above the spool arrangement and the lead line (opposite to the gear-mediated solution described hereinabove with the braking device 6 disposed underneath the spool arrangement 4).

The leash assembly 10 further comprises a braking power control device 7 configured to adjust rotation speed of the spool arrangement and the rate, at which the lead line 3 unwinds from said spool arrangement 4. The control device 7 can be configured as a lever, a switch, a press button, or any other appropriate arrangement, enabling toggling between at least two switch modes. The control device 7 is thus configured to adjust braking power according to pet behavior.

The term "braking power" is utilized hereby to indicate ability of the braking device 6 to cause the spool 4 to stop from rotation and the lead line—from unwinding, accordingly, whereupon the pet animal is also caused to halt.

Thus, if the pet tends to pull on the leash, the control device 7 can be set into a "stringent" position, wherein the braking device 6 is allowed to contact the spool arrangement 4. On the contrary, in an absence of pulling, the control device 7 can be set into a "loose" position, wherein the braking device 6 does not contact the spool 4. Depending on technical solution, the control device 7 can include more than two gradation modes.

In the embodiment shown on FIGS. 3A, 3B, the "stringent" mode can be established by bringing the external gear 6 to contact the internal gear 4A (within the spool 4) with or without meshing. For example, tips or faces of the gear 6 that establish its' outer helix can be aligned with the same establishing the outer helix of the gear 4A even in an absence of meshing.

It is further preferred, that the leash assembly 10 is equipped with an instant-stop brake device 8 for enabling an "emergency stop" in view of a sudden danger for a pet animal or for a human facing the pet animal, for example. Thus, in some instances gradual braking is not sufficiently fast to prevent the pet from running into an accident or causing an accident. To prevent accident happen, the instant-stop brake device 8 can be manually activated by the user; thereby rotation of the spool arrangement 4 and unwinding of the lead line 3 are stopped immediately.

The instant-stop brake device 8 is preferably equipped with a position lock arrangement 9. The latter can be embodied as a sliding switch, a press button, or as any other appropriate arrangement.

To increase safety of the pet animal during outdoor activities in the darkness and/or in winter, for example, back-reflection elements can be provided on the leash assembly 10 and/or the lead line 3 can be made of the back-reflecting material (not shown).

In another aspect, use of the retractable leash assembly 10 according to any of the embodiments described hereinabove is provided for walking and training a pet animal. In preferred embodiment, the leash assembly 10 is configured for walking and training a dog. For those skilled in the art it is clear that depending on size, weight and/or breed of the dog, the leash assembly 10 can be scaled accordingly, in terms of at least size of the casing, length of the lead line and/or material said lead line is made of.

Use of the leash assembly 10 for walking pet animals other than dogs, such as cats, rabbits or ferrets, for example, is not excluded.

It is clear to a person skilled in the art that with the advancement of technology the basic ideas of the present invention are intended to cover various modifications included in the scope thereof. The invention and its embodiments are thus not limited to the examples described above; instead they may generally vary within the scope of the appended claims.

The invention claimed is:

1. A retractable leash assembly for a pet animal comprising a casing body with a handle attached to the body by an at least one hinge joint, a braking device, and a spool arrangement with an extendable lead line wound thereabout and configured attachable to the pet animals' collar or harness, wherein in said leash assembly the handle is configured to articulate about the joint with regard to the casing body, said articulation movement of the handle being triggered by the pulling force exerted on the lead line by the animal kept on the leash, and wherein, by virtue of said articulation movement the braking device actuates a braking action causing the lead line to reduce unwinding speed proportionally with an increase in the pulling force.

2. The retractable leash assembly of claim 1, in which, upon articulation movement of the handle about the joint, the braking device is brought into contact with the spool arrangement and/or the lead line.

3. The retractable leash assembly of claim 2, in which the braking device is configured to preserve its' contact with the spool arrangement and/or the lead line as long as the pulling force is exerted on the lead line.

4. The retractable leash assembly of claim 2, in which, upon articulation movement of the handle about the joint, the braking device is configured to interconnect with the spool arrangement.

5. The retractable leash assembly of claim 2, in which, upon articulation movement of the handle about the joint, the braking device and the spool arrangement establish a spur gear system, wherein an external spur gear is established by the braking device and an internal spur gear is established by the spool arrangement.

6. The retractable leash assembly of claim 1, in which the braking device is configured to preserve its' contact with the spool arrangement and/or the lead line as long as the pulling force is exerted on the lead line.

7. The retractable leash assembly of claim 6, in which, upon articulation movement of the handle about the joint, the braking device is configured to interconnect with the spool arrangement.

8. The retractable leash assembly of claim 6, in which, upon articulation movement of the handle about the joint, the braking device and the spool arrangement establish a spur gear system, wherein an external spur gear is established by the braking device and an internal spur gear is established by the spool arrangement.

9. The retractable leash assembly of claim 1, in which, upon articulation movement of the handle about the joint, the braking device is configured to interconnect with the spool arrangement.

10. The retractable leash assembly of claim 1, in which, upon articulation movement of the handle about the joint, the braking device and the spool arrangement establish a spur gear system, wherein an external spur gear is established by the braking device and an internal spur gear is established by the spool arrangement.

11. The retractable leash assembly of claim 1, wherein the braking device is configured as a friction brake device.

12. The retractable leash assembly of claim 1, wherein the contact area and/or frictional force between the braking device and any one or both of the spool arrangement and the lead line increase proportionally with an increase in the pulling force.

13. The retractable leash assembly of claim 1, wherein the braking device is disposed inside the handle.

14. The retractable leash assembly of claim 1, further comprising a winding mechanism, preferably configured as a spring-loaded winding mechanism.

15. The retractable leash assembly of claim 14, wherein the winding mechanism is disposed inside the casing body.

16. The retractable leash assembly of claim 1, further comprising a braking power control device configured to adjust the rate, at which the lead line unwinds from the spool arrangement.

17. The retractable leash assembly of claim 1, further comprising an instant-stop brake device, preferably equipped with a position lock arrangement.

18. The retractable leash assembly of claim 1, wherein the lead line is configured as a cord or a flat strap.

19. A method for walking and/or training a pet animal, comprising; providing the retractable leash assembly of claim 1; attaching the extendable lead line to the pet animal's collar or harness; and walking and/or training the pet animal while holding the handle.

20. The method of claim 19, wherein the pet animal is a dog.

\* \* \* \* \*